United States Patent
Kurylko et al.

(10) Patent No.: US 11,354,650 B2
(45) Date of Patent: Jun. 7, 2022

(54) PAYMENT CARD ASSET CONSTRUCTION SERVICE

(71) Applicant: MASTERCARD INTERNATIONAL INCORPORATED, Purchase, NY (US)

(72) Inventors: Marek Kurylko, Bloomfield, NJ (US); Joseph Hayes, Montclair, NJ (US); Pedro Chavarria, Miami, FL (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 339 days.

(21) Appl. No.: 16/715,369

(22) Filed: Dec. 16, 2019

(65) Prior Publication Data

US 2021/0182835 A1 Jun. 17, 2021

(51) Int. Cl.
*G06Q 20/30* (2012.01)
*G06Q 30/06* (2012.01)
(Continued)

(52) U.S. Cl.
CPC ........... *G06Q 20/3552* (2013.01); *G06F 9/54* (2013.01); *G06F 16/51* (2019.01);
(Continued)

(58) Field of Classification Search
None
See application file for complete search history.

(56) References Cited

U.S. PATENT DOCUMENTS

| 5,889,941 A | 3/1999 | Tushie et al. |
| 7,121,456 B2 * | 10/2006 | Spaeth ............... G06Q 30/0226 235/375 |

(Continued)

OTHER PUBLICATIONS

Qasim, T., et al., "Interactive Shopping with Mobile Wallet," 2012 World Congress on Sustainable Technologies (WCST): 32-36; 117. IEEE. (Year: 2012).*

(Continued)

*Primary Examiner* — Nicholas D Rosen
(74) *Attorney, Agent, or Firm* — Buckley, Maschoff & Talwalkar LLC

(57) ABSTRACT

Apparatus and methods for providing a digital card asset construction service. In and embodiment, a digital card asset service computer provides access to a digital card asset application user interface (API) to an issuer device, then receives a request from a user to construct or update a digital payment card product and receives card art data for the digital payment card product responsive to one or more queries presented by the digital card asset API. The process also includes receiving, by the digital card asset service computer from the issuer device, digital payment card product characteristics data responsive to at least one digital payment card product characteristic query, transmitting computer executable instructions to the issuer device for rendering an image of a payment card on a display screen of the issuer device as the user inputs data, then receiving an indication that the user is finished inputting data, and lastly storing a payment card product data file that includes card art data and payment card product characteristics data to a cloud service.

16 Claims, 5 Drawing Sheets

(51) Int. Cl.
  *G06Q 40/02* (2012.01)
  *G06F 9/54* (2006.01)
  *G06F 16/51* (2019.01)
  *G06Q 20/34* (2012.01)

(52) U.S. Cl.
  CPC ..... *G06Q 20/3558* (2013.01); *G06Q 30/0621* (2013.01); *G06Q 30/0643* (2013.01); *G06Q 40/02* (2013.01)

(56) References Cited

U.S. PATENT DOCUMENTS

| | | | | |
|---|---|---|---|---|
| 8,577,810 | B1* | 11/2013 | Dalit | G06Q 20/206 705/67 |
| 2004/0099730 | A1 | 5/2004 | Tuchler et al. | |
| 2004/0153715 | A1* | 8/2004 | Spaeth | G06Q 40/12 714/4.11 |
| 2007/0288378 | A1 | 12/2007 | Ferrara et al. | |
| 2008/0313205 | A1 | 12/2008 | Eglar et al. | |
| 2011/0270749 | A1* | 11/2011 | Bennett | G06Q 30/04 705/40 |
| 2012/0089506 | A1 | 4/2012 | Markison | |
| 2013/0024371 | A1* | 1/2013 | Hariramani | G06Q 20/384 705/41 |
| 2014/0006274 | A1* | 1/2014 | Grigg | G06Q 20/36 705/41 |
| 2014/0037220 | A1 | 2/2014 | Phillips et al. | |
| 2019/0005487 | A1* | 1/2019 | Maheshwari | G06Q 20/351 |

OTHER PUBLICATIONS

Anon., "ICICI Bank to launch e-wallet for mobile NFC payment later this year," DNA: Daily News and Analysis [Mumbai] Jan. 22, 2015. (Year: 2015).*

* cited by examiner ated with the PAN.

PAYMENT CARD ASSET CONSTRUCTION SERVICE

FIELD OF THE INVENTION

The present invention relates to a payment card asset construction service for use by payment card issuers to create and/or update payment card assets. More specifically, in some embodiments a payment card asset creation service generates a customer payment card asset in accordance with input from an issuer financial institution (FI) which can then be delivered to a plurality of different sources, such as wallet service providers and/or e-commerce websites.

BACKGROUND

Payment cards such as credit cards and/or debit cards are ubiquitous. Such payment cards can be issued in physical form and may include a magnetic stripe on which the relevant account number and/or other data is stored. To consummate a purchase transaction with credit or debit card, the card is swiped through a magnetic stripe reader which is associated with a point of sale (POS) terminal. The magnetic stripe reader reads the account number from the magnetic strip and then routes a transaction authorization request to a payment card system which responds to the POS terminal.

In pursuit of greater convenience and more rapid transactions at POS terminals, payment cards have been developed that include a radio frequency identification (RFID) integrated circuit ("IC," often referred to as a "chip") embedded in the card body with an antenna that allows the account number to be automatically read from the card by radio frequency (RF) communication between the payment card and a proximity reader, which may be incorporated with the POS terminal. Such cards are commonly known as "chip cards" and/or "proximity payment cards" and/or "contactless payment cards." In typical arrangements, the RFID IC is powered from an interrogation signal which is transmitted by the proximity reader and received by the payment card antenna. MasterCard International Incorporated, the assignee hereof, has established a widely-used standard, known as "PayPass", for interoperability of contactless payment cards and proximity readers.

The capabilities of a contactless payment card have also recently been incorporated into consumer mobile devices, such as mobile telephones, laptop computers, tablet computers, personal digital assistants (PDAs) and the like, thereby turning such devices into contactless payment devices. Such consumer mobile devices typically include integrated circuitry with the same functionality as the RFID IC of a contactless payment card. For example, a mobile telephone configured to operate as a contactless payment device includes a loop antenna that is coupled to a payment-related IC for use in sending and/or receiving messages in connection with a transaction that involves contactless payment. When a consumer wishes to pay for a purchase by utilizing his or her mobile telephone, the consumer typically first selects a payment account by using a mobile wallet graphical user interface (GUI). The mobile wallet GUI may display several primary account numbers (PANs) that each relate to a different payment account so that the consumer can select which payment account to use in a purchase transaction. In some cases, one or more generic images of a credit or debit card that has been stored in memory on the mobile telephone may be displayed along with the PAN, and the generic image may indicate the type of credit card or debit card (for example, MasterCard™ or Visa™) associated with each PAN. After a selection is made, the consumer is typically directed to "tap" his or her phone near an RFID reader.

Consumers wishing to pay for online purchases typically must enter payment card information and/or details into the website payment application. A particular consumer may have previously entered information associated with several different payment accounts into a particular retail website (such as Amazon.com) which have been saved in a secure manner, and thus that consumer will have to identify which one of those payment accounts that he or she wishes to use. In some cases, the consumer reads the PAN appearing on the website page for each credit and/or debit card and then compares those numbers to a physical credit card or debit card. A website may also display one or more generic images of a credit card or a debit card alongside the PANs entered by the consumer, which generic images may indicate the type of credit card or debit card (for example, MasterCard™ or Visa™) associated with the PAN.

When issuer financial institutions (FIs) wish to display or present their digital payment card assets on an e-commerce website and/or provide representations of payment card assets in digital wallets for use by consumers, the issuer FIs need to create and then submit digital payment card assets (which includes the card artwork) to such e-commerce web sites and/or to digital wallet providers. The inventors recognized that it would be beneficial to provide a service to payment card account issuers, such as issuer financial institutions (FIs) or issuer banks, which facilitates the creation or construction and/or submission of digital payment card assets. It would also be advantageous if the service facilitates the creation of digital payment card asset files that include card art data allowing presentation and/or display of the digital payment card on multiple form factors and/or on a plurality of platforms (for example, digital payment card asset files having card art data permitting display on an e-commerce website and on a consumer mobile device and on a digital watch device). Moreover, it would be advantageous to provide a payment card assets service which ensures that the digital payment card assets which are created automatically conform to network standards, geographical standards and/or branding related standards required by a payment card processing entity, such as Mastercard International Incorporated.

DETAILED DESCRIPTION

Figure 1:
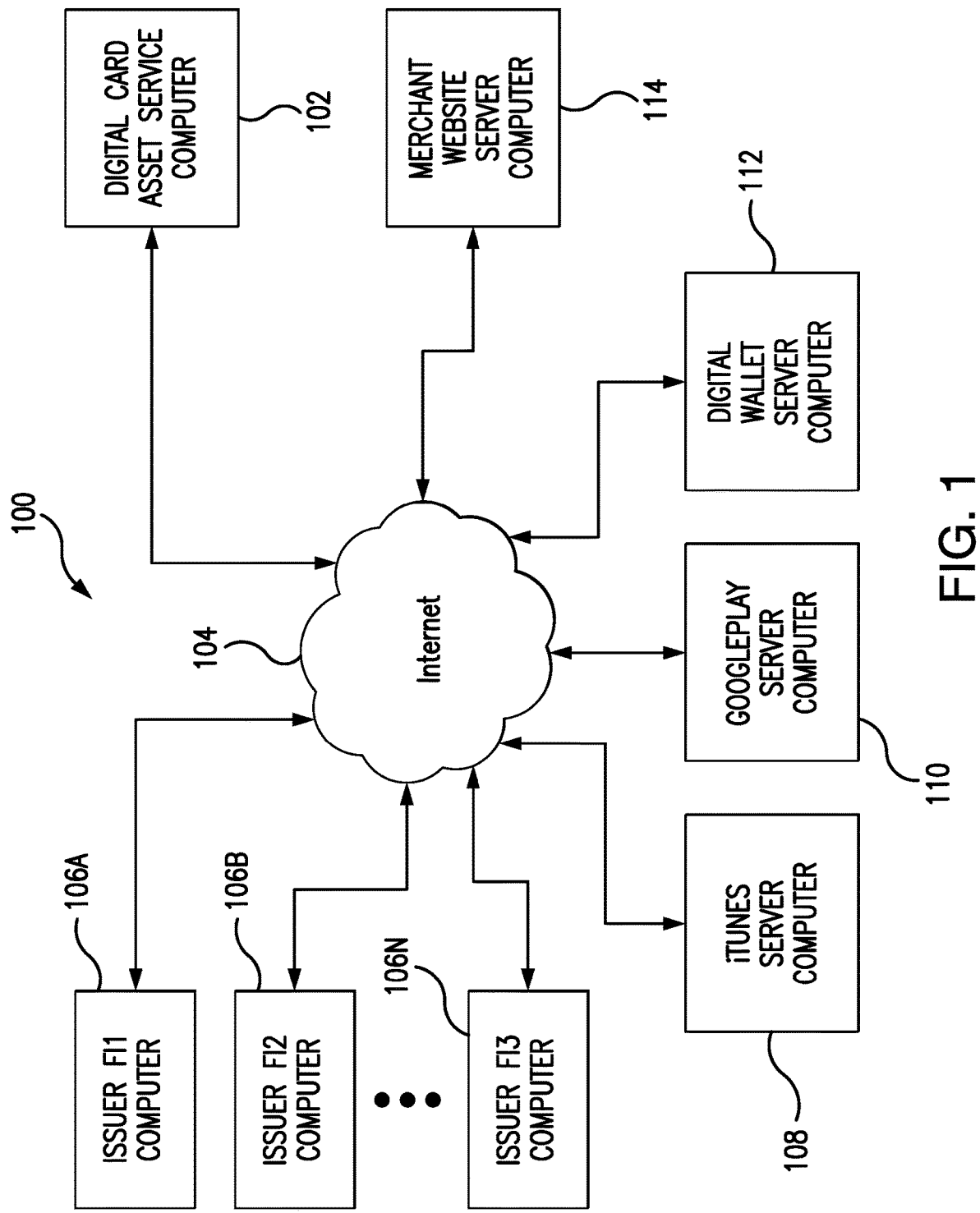
FIG. 1 is a block diagram illustrating a digital payment card asset service system according to some embodiments of the disclosure.

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather are used for convenience and ease of exposition. For example, as used herein, the term "consumer" may be used interchangeably with the term "cardholder," and such terms are used herein to refer to a person, individual, business or other entity that owns (or is authorized to use) a financial account such as a payment card account (for example, a credit card account). In addition, the term "payment card account" may include or be associated with a credit card account, a debit card account, and/or a deposit account or other type of financial account that an account holder may access. The term "payment card account number" includes a number that identifies a payment card system account or a number carried by a payment card, and/or a number that is used to route a transaction in a payment network that handles debit card and/or credit card transactions and the like. Moreover, as used herein the terms "payment network," "payment card system" and/or "payment system" refer to a system and/or network for processing and/or handling purchase transactions and related financial transactions, which may be operated by a payment card system operator, such as Mastercard International Incorporated (the assignee of the present application), or a similar system. In some embodiments, the term "payment card system" may be limited to systems in which member financial institutions (such as banks) issue payment card accounts to individuals, businesses and/or other entities or organizations.

As used herein, the term "issuer" and/or "issuer FI" and/or "issuer bank" is used to refer to the financial institution (FI) or entity (such as a bank) that issues a payment card account (such as a credit card account or debit card account) to a consumer or accountholder or cardholder. The issuer of a payment card account maintains those payment card accounts of its cardholders.

In general, and for the purpose of introducing concepts of novel embodiments described herein, disclosed are methods, apparatus and systems for facilitating the creation of digital payment card assets by payment card account issuers, including issuer financial institutions (FIs) and/or issuer banks. In some embodiments, a card creation application programming interface (API) and/or a web tool is provided by a card payments processor entity, such as Mastercard International Incorporated, which can be accessed and utilized by an issuer FI to create one or more digital payment card assets. The card creation API facilitates the process by allowing an issuer FI to make payment card asset selections which automatically satisfy branding guidelines and/or local jurisdiction regulations and/or digital payment card standards and/or rules of the card payments processor entity. For example, the card creation API may provide a plurality of menu items associated with payment card asset characteristics which can be chosen by the issuer FI when creating and/or updating a digital payment card asset. Such characteristics may include, but are not limited to, a background color for the payment card product, a company logo, a product type, a payment card promotion expiration date, selection of one or more form factors, and the like. Such offered selections may also beneficially provide a visual "bells and whistles" reminder to issuer FI personnel or payment card designers concerning the types of features and/or options available to them when designing one or more payment card products for their customers.

In addition, in some embodiments described herein, the card creation API and/or web tool renders the image of the payment card asset in real time as it is being built or created by the issuer FI (i.e., a payment card image is rendered on a display screen for review by an employee of the issuer FI as menu choices are selected). Such operation advantageously allows an issuer FI to make changes on the fly to the payment card account image and/or other features until the employee or representative of the issuer FI is satisfied with the results. In some implementations, once the issuer FI is satisfied with the digital representation and other characteristics of the payment card asset, a card art digital file can be generated and saved. The card art digital file may include data allowing the payment card image to be presented and/or displayed on multiple form factors or platforms (for example, on an e-commerce web site and/or on a consumer mobile device and/or on a consumer wearable device such as a digital watch device) and contain other types of data or information concerning the digital payment card asset. The issuer FI can then submit the card art digital file to any digital store or digital distribution service (such as Google Play™ or iTunes™) designated by the issuer FI. For example, the issuer FI may submit the card art digital file to a merchant website and/or to a wallet provider service without needing to also provide sizing and/or resolution data because the card creation API and/or web tool automatically generated such data while the issuer FI was building the digital card asset. In some embodiments, the issuer FI may also save multiple payment card images (multiple forms of card art data) with an identifier that can be referenced back to a particular portfolio and/or to a payment card account range and can update any of the images in the future by using the card creation API and/or web tool.

In some embodiments, when an issuer FI updates a payment card image file or adds a new payment card image, the card creation API and/or web tool stores the updated and/or new payment card image data files in the cloud at a location which is identified by a uniform resources locator (URL). Then the content located at the end destination(s) or endpoint(s) (for example, a merchant or a digital wallet) designated by the issuer FI are updated with the new or updated image data and/or characteristics data that apply. A URL is a unique reference to a resource on the Internet, and is beneficially utilized in this context because when the payment card art needs to be updated (for example, a rebranding occurs, or a customer or cardholder is promoted or upgraded to a better class of the product which, for example, may have additional and/or different and/or special visual aspects associated with it) and/or the promotion period for a particular payment card product ends, the endpoint does not have to be updated. In addition, given that an endpoint does not need to be updated, there is no need for unnecessary "refreshes" to occur in an attempt by a merchant, for example, to pull a new payment card asset in a situation where there may not even be a new asset available for pulling.

Such functionality allows, for example, an issuer FI or issuer bank to create a custom payment card account asset wherein the digital payment card image can be rendered and reviewed by the issuer FI in real time, which advantageously allows the issuer FI to make desired changes on-the-fly. In addition, disclosed embodiments permit issuer FIs to automatically satisfy the branding guidelines and/or local jurisdiction regulations and/or requirements of the payment card processing entity responsible for processing transactions involving the payment card account asset (which transactions typically occur between a consumer or cardholder and a merchant). Moreover, disclosed embodiments simultaneously and automatically generate digital payment card asset image data and/or digital card art files which satisfy screen resolution and sizing requirements concerning the type or types of consumer devices and/or merchant websites for which the digital payment card asset will be used (in accordance with information provided by the issuer FI).

FIG. 1 is a block diagram illustrating a digital payment card asset service system 100 according to some embodiments. A digital card asset service computer 102 is operably connected to the Internet 104 and configured for communicating with a plurality of issuer financial institutions (FIs0, such as issuer FI1 106A, issuer FI2 106B, and on to issuer FIn 106N. The digital card asset service computer 102 is also configured for communicating with an iTunes® server computer 108, a Google Play® server computer 110, a digital wallet server computer 112 and a merchant website server computer 114 via the Internet 104. The digital card asset service computer 102 and each of the other computers or blocks depicted in FIG. 1 should be understood as representing the indicated entity, and as also representing one or more computers and/or computer systems operated by the indicated entity.

In some embodiments, the digital card asset service computer 102 is owned and/or managed by a service provider company such as Mastercard International Incorporated, the assignee of the present application, and provides a digital payment card asset service which may include a card creation web tool and/or a card creation API for use by issuer FIs such as issuer banks to create and/or update digital card asset characteristics. Thus, in addition to showing relationships among the various parties that make up the digital card asset service system 100, FIG. 1 also depicts a network of computers configured to exchange information for the purpose of implementing a digital card asset service. Furthermore, although FIG. 1 illustrates an Internet-based system, it should be understood that the system 100 could be implemented by utilizing other public and/or private network configurations that enable communications between the digital card asset service computer 102 and one or more of the various members or components of the system. For example, the issuer FIs 106A to 106N may have an existing relationship and existing connectivity via a payment network which also provides a digital payment card asset service, such as the payment network owned and operated by Mastercard International Incorporated, and thus utilize that private payment network connectivity to enable communications between the digital card asset service computer 102 and one or more of the various members or components of the system as described herein.

Figure 2:
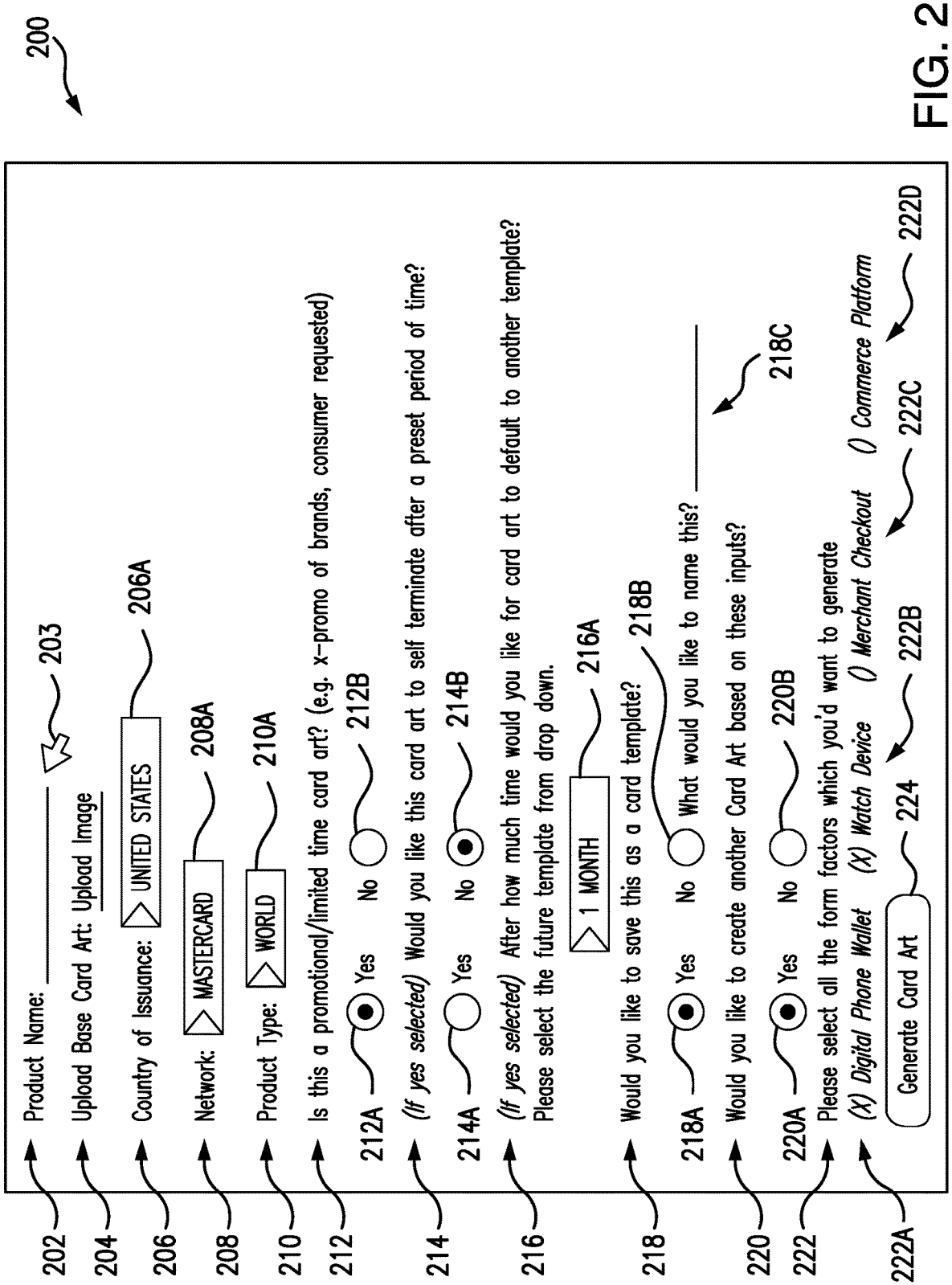
FIG. 2 illustrates a digital payment card asset user interface (UI) for use by issuer financial institutions to generate digital payment card asset files in accordance with some embodiments of the disclosure.

FIG. 2 illustrates a digital card asset user interface (UI) 200 for use by personnel or an employee of an issuer FI to provide digital card asset information and generate digital card asset data files in accordance with some embodiments. In some embodiments, a digital card asset data file contains payment card asset characteristics data and payment card art data necessary to create or update a digital payment card and to render a digital payment card image on one or more platforms. The digital card asset UI 200 may be provided by a digital card asset application programming interface (API) or a digital card asset web tool which can be accessed by communicating with a digital card asset service computer 102 via the Internet 104, for example, and may contain a plurality of selection options, as shown.

Referring to FIG. 2, an employee or representative of an issuer FI may use an electronic device, such as a laptop computer and a computer mouse to control a cursor 203, or a mobile device with a touchscreen (such as a smartphone) to control the cursor 203, to first access the payment card asset UI 200 and then to select options and/or enter data, such as entering a product name 202 in the space provided. For example, the user or issuer FI employee may upload base card art 204 which may have been created in-house (for example, by a bank issuer's branding and/or marketing department), or may have been sourced from a creative agency. In some implementations, base card art templates (not shown) may be provided by the entity providing the payment card asset UI 200, at least some of which may be considered "plain vanilla" offerings that could be updated by the issuer FI at a later time. In some implantations, the issuer FI employee then selects a country of issuance 206 from a drop-down menu 206A (such as "United States" or "Canada," etc.) which selection can drive which branding guidelines are required for the digital card asset and/or for generating card image data for a particular type of digital payment card. For example, a particular country or jurisdiction may require generating card image data that includes the primary account number (PAN) of the digital payment card, and/or may require the card verification code (CVC) data and/or expiration date data to be listed and/or included in the card art data. The issuer FI employee also selects a Network 208 from a drop-down menu 208A, such as the Mastercard™ or Cirrus™ or Maestro™ network, which selection impacts potential logo and/or brand name placements, available color schemes for that type of network, and the like. Next, a product type 210 is selected from a drop down menu 210A from one or more product types offered by the selected Network 208 (for example, Mastercard International Incorporated offers "Standard," "Gold," "Platinum," "World" and "World Elite" categories of payment cards, while other networks may offer other types or categories of payment cards).

In some embodiments, an employee or card designer of the issuer bank who is creating or building or updating the payment card product can see the digital card asset UI 200 on a first portion of a computer display screen and at the same time view a rendering and/or summary of the payment card product on a second portion of the computer display screen (what is commonly referred to as a "split-screen" view or display) as the designer enters data. In this manner the designer can see and assess the progress of the design of the payment card product in real-time. In another contemplated implementation, as the designer is inputting data into the digital card asset UI 200 he or she may select a "See Current Card Design Progress" radio button (not shown) or the like that, when selected, provides the designer with a display or rendering of the payment card product in its' current state (which may also include a summary of the current payment card profile information). In this implementation, the designer may also be provided with a "Back" radio button (not shown) to return to the digital card asset UI 200 after viewing the rendering of the payment card product in order to input additional data to continue with the payment card product design.

Referring again to FIG. 2, the issuer FI employee may then indicate if the selected payment card product is a promotional payment card 212 (or limited time payment card). If Yes 212A is selected (as shown), then the issuer FI must indicate whether or not the card art is to self-terminate 214. If Yes 214A is selected, then the issuer FI must indicate when to terminate 216 by using a drop-down menu 216A (which may include time periods such as one-month, two-months, three-months, six-months, one year, etc.). When such a promotional payment card is created, then in some embodiments templates may drive any co-branded real-estate card art image data, and/or personalized options (such as a cardholder receiving a "Gold" payment card instead of a "Silver" payment card during the promotion) may drive the co-branded real-estate card art image data. For example, an issuer bank may partner with a payment card network company and with a call-hailing car company to create a co-branded and self-terminating promotional payment card product called a "Glitter Ride" card that self-terminates in three-months. In this case, the digital card asset UI 200 includes a required glitter template for use when designing the co-branded Glitter Ride payment card that provides a glitter-themed background portion along with other card art image data choices.

When the payment card product is not a promotional product then the issuer FI then selects the "No" option 212B shown in FIG. 2. Alternately, even if the payment card product is a promotional product, and thus the "Yes" option 212A is selected, the payment card designer can select the "No" option 214B indicating that there is to be no expiration date, and thus that promotional digital payment card product will not self-terminate. In addition, the issuer FI employee may indicate 218 if the card template should be saved by selecting either the "Yes" option 218A or the "No" option 218B. If "Yes" 218A is selected, then the issuer FI employee enters a name for the template to be saved in a template field 218C. An indication can also be provided 220 by the issuer FI employee indicating whether or not another card art data file should be created based on the selections already provided by selecting either the "Yes" option 220A or the "No" option 220B.

The digital payment card asset UI 200 embodiment shown in FIG. 2 also asks the user or issuer FI employee to select 222 all applicable form factors, which as shown may include a digital mobile device wallet 222A, a watch device 222B, a merchant checkout 222C, and an e-commerce platform 222D (wherein the 222A and 222B options are selected). After the issuer FI employee makes one or more of these selections, he or she clicks on a "Generate Card Art" button 224, which causes the card asset API 200 to generate one or more digital payment card art data files. In particular, the digital payment card asset API generates payment card image data (or card art data) in the size required for each form factor selected, and in some implementations uploads that data to a cloud service.

In some embodiments, the digital card asset API or web tool automatically loads generated payment card image data files for use with Mastercard Digital Enablement Services (MDES) and for use with non-MDES platforms. For example, a digital mobile device wallet service may require payment card image data files for rendering a detailed image of the digital payment card on one or more types of consumer mobile devices, such as a cell phone or Smartphone, a laptop computer, a tablet computer, an eBook, an e-Reader, a smart-watch or other portable digital device and the like. Such a detailed card image data files may include easily identifiable characteristics such as, for example, a color background or color scheme indicative of the issuer FI, a logo or icon identifying the type of payment card account (i.e., a particular network credit card or network debit card account), a partial or full primary account number (PAN), one or more background images, identifying text (which may include the name of, or otherwise identify, the issuer financial institution (FI), and/or an expiry date. In embodiments, the data processing involved in obtaining data and/or delivering and displaying the detailed image of the cardholder's payment card on the cardholder's electronic device is transparent to the cardholder.

Prior to accessing the digital payment card asset UI 200, an issuer FI may be required to register with the digital payment card asset service. For example, branding personnel of an issuer FI may be required to review and/or agree to terms and/or conditions of a branding document or licensing agreement and obtain an approved bank identification number (BIN) range. In addition, the issuer FI may be required to agree that any particular payment card design must meet certain predetermined branding requirements, such as having a color scheme that does not conflict with and/or dilute a trademarked logo's color scheme will appear as part of the card art data and or card art image data file. In addition, merchants and/or service providers and/or digital wallet service providers may be required to agree to certain terms and conditions concerning the payment card art data. For example, merchants and/or service providers and/or digital wallet service providers may be required to agree to not alter any dimensions and/or ratios associated with a card art data file made available through the service, agree not to make any alterations or overlays to the card art colors, logos or any added effects, agree to allow updates of payment card art data, and/or agree to terminate payment card art data when an expiration date is satisfied or when an instruction is pushed from then payment card asset service computer platform to do so. In addition, the agreement and/or contract may require merchants and/or wallet service providers to agree not to aggregate the payment card art obtained from the digital payment card asset service for any purposes other than what has been agreed upon, and to agree that any marketing planned by the merchant and/or digital wallet service provider using the payment card art data must first be cleared by the issuer FI and the owner of the digital payment card asset service (typically and payments processing network such as the Mastercard™ network).

In embodiments disclosed herein, the digital card asset service computer platform includes a digital card asset API that is pre-populated with standards and/or criteria concerning what an appropriate template consists of for each payment processor network (i.e., Mastercard™ Cirrus™, or Maestro™ network, etc.) and payment card product type. Outputs of the digital card asset API or web tool can also adapt or change as form factor selections are made by the employee of an issuer FI to ensure, for example, that appropriate ratios are retained for payment card art data prior to being transmitted. For example, the payment card asset service computer platform may include instructions and or requirements regarding the ratio of the Network logo to the entire card art, for example, a requirement may be that the ratio must be "X:Y," whereas another requirement may concern the placement of a Network logo. In some implementations, the payment card asset service computer platform will not allow any variation of such ratios and is configured to lock the placement of the Network logo after selections have been made. For example, a requirement may be that the Network logo must be no further than "N" pixels away from one or more eligible corners of the payment card, which will automatically be followed and locked. In addition, the payment card asset service computer platform ensures that any time-restrictions selected by the issuer FI and associated with the payment card art are followed, so that the Issuer FI can achieve their goals.

Figure 3:
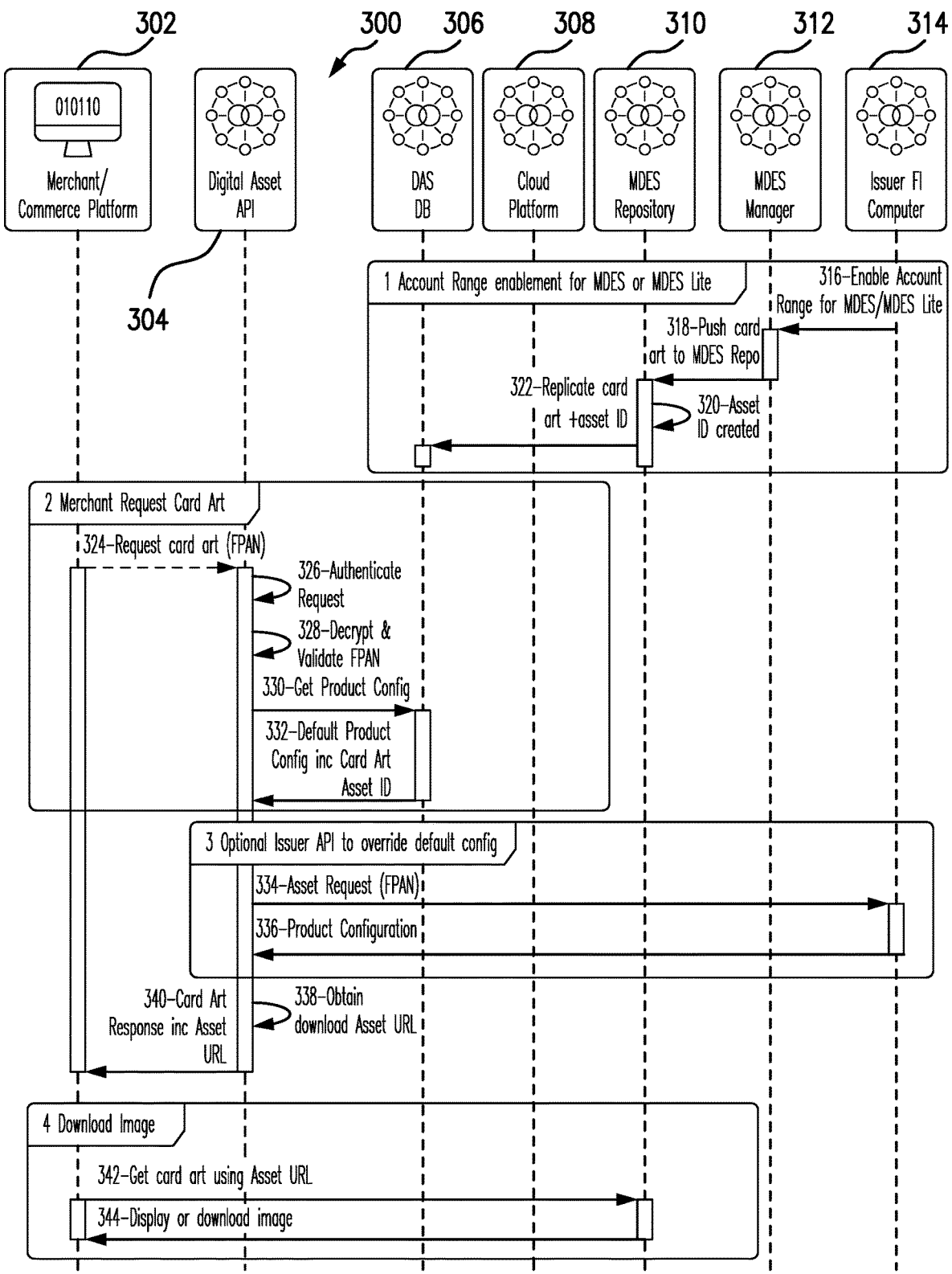
FIG. 3 is flow diagram of a process for providing a payment card asset service in accordance with embodiments of the disclosure.

FIG. 3 is flow diagram of a process 300 for providing a payment card asset service in accordance with embodiments described herein. Components involved in processing requests for payment card account assets data include a merchant and/or commerce computer platform 302, a Digital Asset application programming interface (API) 304, a Digital Asset Service (DAS) database 306 (which stores mapping data between a Device Primary Account Number (DPAN) or a Funding Primary Account Number (FPAN) and a payment card art asset), a cloud computer platform 306, a Mastercard Digital Enablement Service (MDES) computer platform 308, an MDES Repository computer 310, an MDES manager computer 312 and an issuer FI computer 314. An issuer FI first enables an account range (such as a bank identification number (BIN) range) for a new or updated digital asset (payment card account type) for a digital enablement service system, such as the MDES, by utilizing an issuer FI computer 314 to transmit 316 an enable account range request to the MDES manager computer 316. This occurs because in the MDES configuration, an employee or representative of an issuer FI (who maybe a Mastercard technology account manager) would setup whether particular card art is available for use in the MDES as a whole, but would be required to enable a selected account range for a new payment card product due to co-branded payment card product agreements. For example, issuer Bank A has a cobranding agreement for payment card products with the ZZ Automobile Club and also has signed agreements with telephone manufacturer 1 and telephone manufacturer 2. Bank A also has a stipulation in the cobranding agreement with ZZ Automobile club which grants ZZ Automobile Club the right to provide input into the payment card design, and thus Bank A may only activate a certain percentage of their payment card portfolio until that issue is resolved.

Referring again to FIG. 3, after an account range has been enabled, the MDES manager computer 316 pushes 318 the payment card art to the MDES repository 310 which creates 320 a payment card asset identifier (ID). The MDES repository 310 then transmits 322 a replicate card art instruction and the payment card asset ID to the Digital Asset Service (DAS) database 306. Thus, in some embodiments the payment card art is generated and on-boarded as part of the Issuer and MDES enablement process. In addition, in some implementations the payment card art is stored in the cloud.

When a merchant operating a merchant e-commerce platform 302 wishes to allow the use of an issuer FI's credit card asset, then an employee or representative of that merchant's e-commerce platform 302 requests 324 card art (associated with the Financial Primary Account Number (FPAN)) by utilizing the digital asset API 304. After receiving the card art request, the digital asset API 304 authenticates 326 the request, decrypts and validates 328 the FPAN, and transmits 330 a request for digital asset product configuration data to the DAS database 306. If there is a promotional asset active and available, the DAS database 306 transmits that data to the digital asset API 304; otherwise the DAS database 306 transmits 332 a default payment card product configuration card art asset identifier to the digital asset API 304. (It should be noted that the payment card asset URL will automatically reflect the "new" card art upon the expiration or conclusion of the promotional asset duration.) The digital asset API 304 then obtains 338 a download asset URL, if it is available (which overrides the default product configuration) and transmits 340 the card art response asset URL to the merchant e-commerce platform 302. The merchant e-commerce platform 302 then transmits 342 a get payment card art request to the cloud platform 308 using the download asset URL, and then displays or downloads 344 payment card image data.

In addition, in some embodiments, the digital asset API 304 transmits 334 a payment card product asset request to the issuer FI computer 314, which responds 336 with a product configuration file if one exists for that FPAN—otherwise a default card art value is returned. However, if in step 336 a product configuration was not returned by the issuer FI computer 314, then the default product configuration is utilized.

Figure 4:
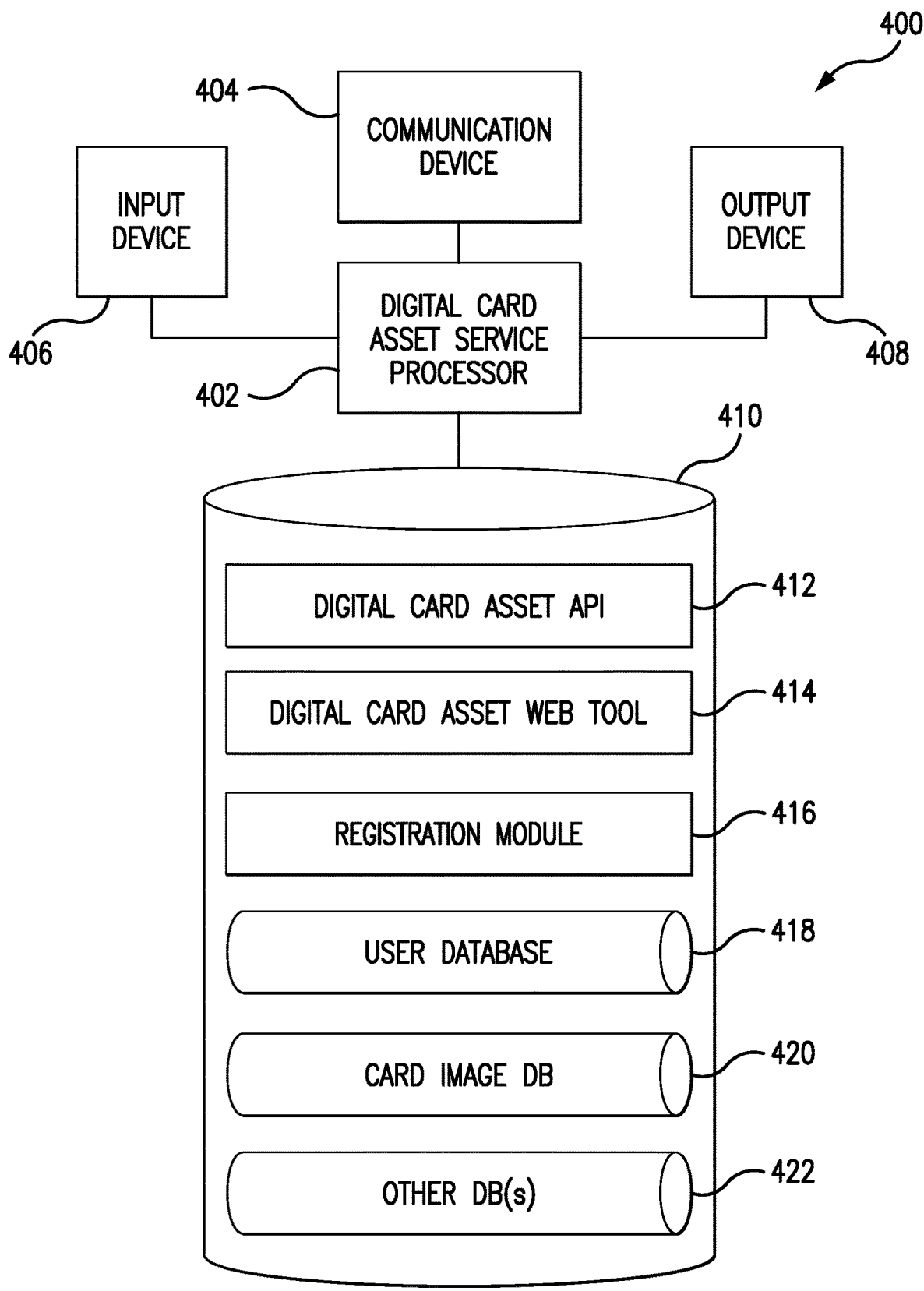
FIG. 4 is a block diagram of a digital card asset service computer according to in accordance with embodiment of the disclosure.

FIG. 4 is a block diagram of a digital card asset service computer 400 according to an embodiment. The digital card asset service computer 400 may be controlled by software to cause it to operate in accordance with aspects of the methods presented herein. In particular, the digital card asset service computer 400 may include a digital card asset service processor 402 operatively coupled to a communication device 404, an input device 406, an output device 408, and a storage device 410. However, it should be understood that, in some embodiments the digital card asset service computer 400 may include several computers or a plurality of server computers that work together as part of a system to provide the service. In such a system, different portions of the overall service may be provided by one or more computers in communication with one or more other computers such that an appropriate scaling up of computer availability may be provided if and/or when greater workloads, for example a large number of payment card art data requests, are encountered.

The digital card asset service processor 402 may constitute one or more processors that operate to execute processor-executable steps, contained in program instructions described herein, so as to control the digital card asset service processor 402 to provide desired functionality.

Communication device 404 may be used to facilitate communication with, for example, electronic devices such as issuer FI computers, an iTunes server computer, a Google Play server computer, digital wallet server computers, and merchant website server computers. The communication device 404 may, for example, have capabilities for engaging in data communication over different types of computer-to-computer data networks, and/or may have wireless communications capability. Any such data communication may be in digital form and/or in analog form.

Input device 406 may comprise one or more of any type of peripheral device typically used to input data into a computer. For example, the input device 406 may include a keyboard, a computer mouse and/or a touchpad or touch screen. Output device 408 may comprise, for example, a display screen and/or a printer.

Storage device 410 may include any appropriate information storage device, storage component, and/or non-transitory computer-readable medium, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "memory", "storage" or a "storage medium."

Thus, it should be understood that the term "computer-readable medium" as used herein refers to any non-transitory storage medium that participates in providing data (for example, computer executable instructions) that may be read by a computer, a processor or a like device. Such a medium may take many forms, including but not limited to, non-volatile media and volatile media. Non-volatile media may include, for example, optical or magnetic disks and other persistent memory. Volatile media may include dynamic random access memory (DRAM), which typically constitutes the main memory. Common forms of computer-readable media include, for example, a floppy disk, a flexible disk, hard disk, magnetic tape, a solid state drive (SSD), any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in providing sequences of computer processor-executable instructions to a processor. For example, sequences of instruction (i) may be delivered from RAM to a processor, (ii) may be wirelessly transmitted, and/or (iii) may be formatted according to numerous formats, standards or protocols, such as Transmission Control Protocol, Internet Protocol (TCP/IP), Wi-Fi, Bluetooth, TDMA, CDMA, and 3G.

Referring again to FIG. 4, storage device 410 stores one or more programs for controlling the processor 402. The programs comprise program instructions that contain processor-executable process steps of the R digital card asset service computer 400, including, in some cases, process steps that constitute processes provided in accordance with principles of the processes presented herein.

The programs may include a digital card asset API 412 and a digital card asset web tool 414 which can manage a process by which digital card issuers (such as issuer FIs) can create digital payment card assets. As explained above, such processes allow an issuer FI to generate digital card asset data files that include data and/or information which satisfies branding guidelines and/or local jurisdiction regulations and/or digital payment card standards and/or rules of the card payments processor entity.

The storage device may also include a registration module 416 for use by issuer FIs, merchants and/or wallet providers to register themselves with the digital card asset server computer 400. In some embodiments, the registration process may allow such parties or entities to register by accessing, for example via their computer, mobile telephone or tablet computer (not shown), a suitable web page hosted by the digital card asset service computer 400. The information gathered during the registration process may include, for example, issuer FI identifier(s) and/or BIN numbers and/or BIN ranges, designated point of contact information for personnel working within the branding department and/or legal department, and the like information and/or data.

The storage device 410 may also include a user database 418 which stores registered users, and a card art image database 420 including computer executable instructions for controlling the digital card asset service computer 400 to provide for, respectively, receiving uploaded card images, for transcoding and scaling the card images, and for transmitting appropriate types of data files to satisfy various platform requirements as selected by a user, such as an issuer FI. The storage device 410 may also include one or more other database(s) 422 and/or have connectivity to other databases (not shown) which may be required for operating the digital card asset service computer 400.

The application programs of the digital card asset service computer 400, as described above, may be combined in some embodiments, as convenient, into one, two or more application programs. Moreover, the storage device 410 may store other programs or applications, such as one or more operating systems, device drivers, database management software, web hosting software, and the like.

Figure 5:
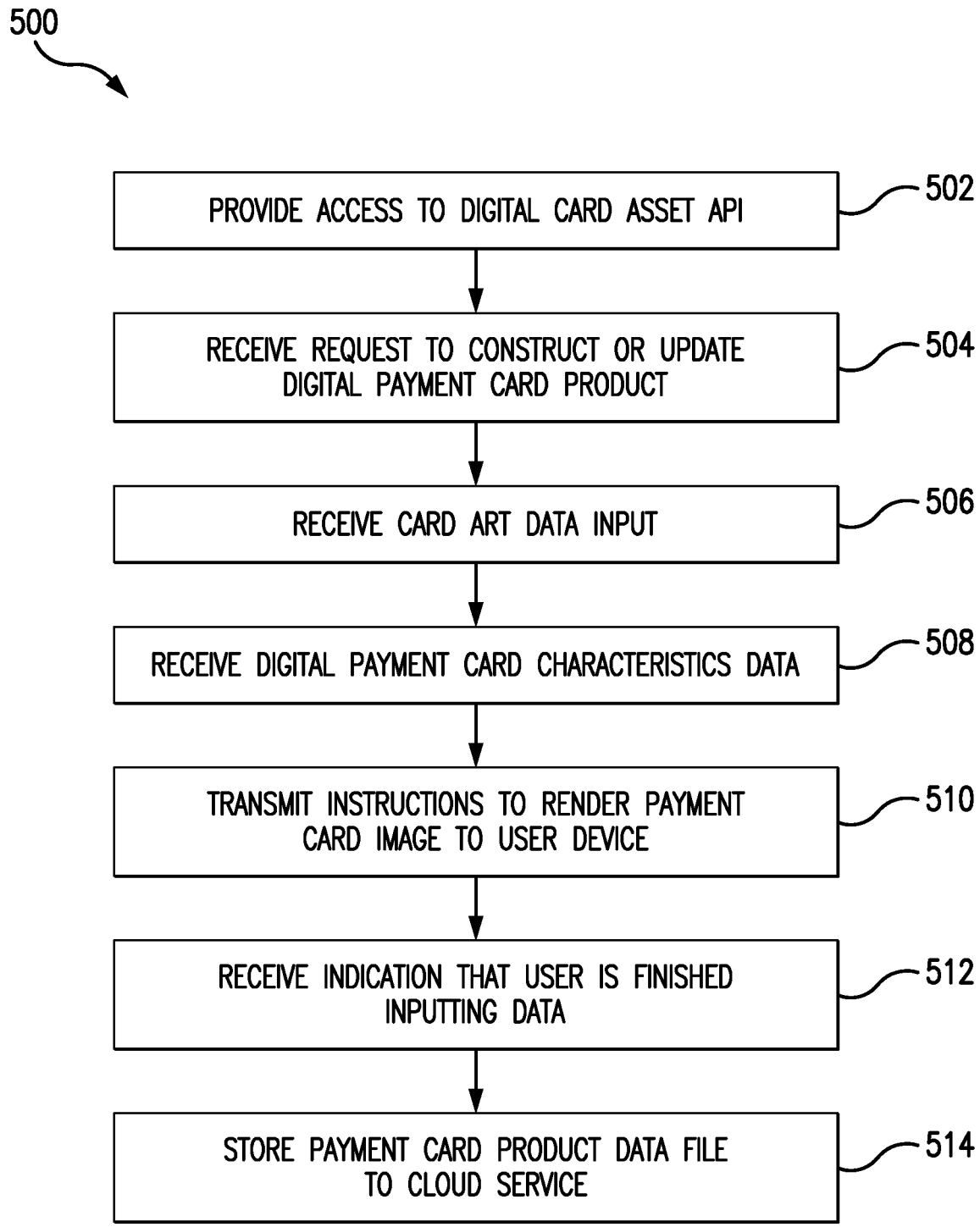
FIG. 5 is a flowchart illustrating a digital card asset construction service process according to some embodiments of the disclosure.

FIG. 5 is a flowchart illustrating a digital card asset construction service process 500 in accordance with processes disclosed herein. A digital card asset service computer provides 502 access to a digital card asset application user interface (API) running on an issuer device (meaning that this issuer has been onboarded to the API), then receives 504 a request from a user of the issuer device, such as an employee of an issuer bank, to construct or update a digital payment card product. The digital card asset service computer also receives 506 card art data for the digital payment card product that is responsive to one or more card art queries presented by the digital card asset API (which may be presented as data entry fields or drop-down menus and the like by the digital card asset API), and receives 508 payment card product characteristics data responsive to at least one digital payment card product characteristic query presented by the digital card asset API (which may be presented as drop-down menu selections associated with digital payment card product characteristics). Next, the digital card asset service computer transmits 510 computer executable instructions for rendering an image of a payment card on a display screen of the issuer device as the user inputs data into the digital card asset API, so that the user can see an image of the digital payment card product on-the-fly in real time as the user is creating or updating the digital payment card product. The digital card asset service computer then receives 512 an indication from the issuer device that the user is finished inputting data into the digital card asset API, and in some implementations then stores 514 a payment card product data file to a cloud service that includes card art data and payment card product characteristics data.

In some implementations, the digital card asset construction service process 500 also includes the digital card asset service computer receiving a selection by the user of at least one digital store, and then transmitting the payment card product data file to one or more digital stores. Examples of a digital store may include a merchant website, a wallet service provider and a digital distribution service. In some embodiments, the process 500 may also include the digital card asset service computer determining that the user updated an existing payment card image file, storing the updated payment card image data files in the cloud, and then automatically pushing a uniform resource locator (URL) associated with the updated payment card image to at least one end destination. Examples of an end destination may include a merchant website and a digital wallet designated by the user of the issuer device.

The flow charts and descriptions appearing herein should not be understood to prescribe a fixed order of performing the method steps described therein. Rather the method steps may be performed in any order that is practicable, including simultaneous performance of steps and/or in an order that omits one or more steps.

Although specific exemplary embodiments have been described herein, it should be understood that various changes, substitutions, and alterations apparent to those skilled in the art can be made to the disclosed embodiments without departing from the spirit and scope of the invention as set forth in the appended claims.

What is claimed is:

1. A digital card asset construction service process comprising:
   providing, by a digital card asset service computer to an issuer device, access to a digital card asset application user interface (API);
   receiving, by the digital card asset service computer from the issuer device, a request from a user to one of construct or update a digital payment card product;
   receiving, by the digital card asset service computer from the issuer device, card art data for the digital payment card product responsive to at least one card art query presented by the digital card asset API;
   receiving, by the digital card asset service computer from the issuer device, digital payment card product characteristics data responsive to at least one digital payment card product characteristic query presented by the digital card asset API;
   transmitting, by the digital card asset service computer to the issuer device, computer executable instructions for rendering an image of a payment card on a display screen of the issuer device as the user inputs data into the digital card asset API responsive to the at least one card art query and responsive to the at least one card product characteristic query;
   receiving, by the digital card asset service computer from the issuer device, an indication that the user is finished inputting data into the digital card asset API; and
   storing, by the digital card asset service computer to a cloud service, a payment card product data file that comprises card art data and payment card product characteristics data.

2. The method of claim 1, further comprising, prior to storing the payment card product data file:
   receiving, by the digital card asset service computer from the issuer device, a selection of at least one platform from the user; and
   generating, by the digital card asset service computer, the card art data file to include card art rendering instructions compatible with the at least one platform selected by the user.

3. The method of claim 2, wherein the at least one platform comprises at least one of a consumer mobile device, a consumer wearable device, and an e-commerce website.

4. The method of claim 1, further comprising:
   receiving, by the digital card asset service computer from the issuer device, selection by the user of at least one digital store; and
   transmitting, by the digital card asset service computer, the card art digital file to the at least one digital store.

5. The method of claim 4, wherein the at least one digital store comprises at least one of a merchant website, a wallet service provider and a digital distribution service.

6. The method of claim 1, wherein the digital payment card product characteristics comprise at least one of a background color for the digital payment card product, a company logo, a product type, a payment card promotion expiration date, and one or more form factors.

7. The method of claim 1, further comprising:
   determining, by the digital card asset service computer, that the user updated an existing payment card image file;
   storing, by the digital card asset service computer, the updated payment card image data files in the cloud; and
   automatically pushing, by the digital card asset service computer to at least one end destination, data associated with the updated payment card image.

8. The method of claim 7, wherein the at least one end destination comprises at least one of a merchant website and a digital wallet designated by the user.

9. An apparatus, comprising:
   a digital card asset processor;
   a communications device operably connected to the digital card asset processor; and
   a storage device operably connected to the digital card asset processor, the storage device storing processor executable instructions which when executed cause the digital card asset processor to:
      provide access to a digital card asset application user interface (API) to an issuer device;
      receive a request from a user of the issuer device to one of construct or update a digital payment card product;
      receive card art data from the issuer device for the digital payment card product responsive to at least one card art query presented by the digital card asset API;
      receive digital payment card product characteristics data from the issuer device responsive to at least one digital payment card product characteristic query presented by the digital card asset API;
      transmit computer executable instructions to the issuer device for rendering an image of a payment card on a display screen of the issuer device as the user inputs data into the digital card asset API responsive to the at least one card art query and responsive to the at least one card product characteristic query;
      receive an indication from the issuer device that the user is finished inputting data into the digital card asset API; and
      store a payment card product data file that comprises card art data and payment card product characteristics data to a cloud service.

10. The apparatus of claim 9, wherein the storage device stores further processor executable instructions, prior to the instructions for storing the payment card product data file, which when executed cause the digital card asset processor to:
    receive a selection of at least one platform from the user of the issuer device; and
    generate the card art data file to include card art rendering instructions compatible with the at least one platform selected by the user.

11. The apparatus of claim 10, wherein the at least one platform comprises at least one of a consumer mobile device, a consumer wearable device, and an e-commerce website.

12. The apparatus of claim 9, wherein the storage device stores further processor executable instructions which when executed cause the digital card asset processor to:
    receive a selection of at least one digital store by the user of the issuer device; and
    transmit the card art digital file to the at least one digital store.

13. The apparatus of claim 12, wherein the at least one digital store comprises at least one of a merchant website, a wallet service provider and a digital distribution service.

14. The apparatus of claim 9, wherein the digital payment card product characteristics comprise at least one of a background color for the digital payment card product, a company logo, a product type, a payment card promotion expiration date, and one or more form factors.

15. The apparatus of claim 9, wherein the storage device stores further processor executable instructions which when executed cause the digital card asset processor to:
   determine that the user updated an existing payment card image file;
   store the updated payment card image data files in the cloud; and
   automatically push data associated with the updated payment card image to at least one end destination.

16. The apparatus of claim 15, wherein the at least one end destination comprises at least one of a merchant website and a digital wallet designated by the user.

\* \* \* \* \*